United States Patent
Fort et al.

(10) Patent No.: US 9,947,019 B2
(45) Date of Patent: Apr. 17, 2018

(54) METHOD AND SYSTEM FOR CONTEXTUAL PROFILING FOR OBJECT INTERACTIONS AND ITS APPLICATION TO MATCHING SYMMETRICAL OBJECTS

(71) Applicant: NBCUniversal Media, LLC, New York, NY (US)

(72) Inventors: Pavel A. Fort, Westbury, NY (US); Sheau Ng, Wayland, MA (US); Amy Shriber, Brookly, NY (US)

(73) Assignee: NBCUniversal Media, LLC, New York, NY (US)

( * ) Notice: Subject to any disclaimer, the term of this patent is extended or adjusted under 35 U.S.C. 154(b) by 311 days.

(21) Appl. No.: 13/892,834

(22) Filed: May 13, 2013

(65) Prior Publication Data
US 2014/0337091 A1 Nov. 13, 2014

(51) Int. Cl.
G06F 17/30 (2006.01)
G06Q 30/02 (2012.01)

(52) U.S. Cl.
CPC ..... *G06Q 30/0201* (2013.01); *G06Q 30/0241* (2013.01)

(58) Field of Classification Search
None
See application file for complete search history.

(56) References Cited

U.S. PATENT DOCUMENTS

| | | | | |
|---|---|---|---|---|
| 7,698,170 | B1* | 4/2010 | Darr | G06Q 30/0609 705/26.35 |
| 7,720,720 | B1* | 5/2010 | Sharma | G06Q 30/0631 705/26.7 |
| 8,296,179 | B1* | 10/2012 | Rennison | 705/14.26 |
| 2006/0090185 | A1* | 4/2006 | Zito | G06F 17/30035 725/46 |
| 2006/0294084 | A1* | 12/2006 | Patel et al. | 707/3 |

(Continued)

OTHER PUBLICATIONS

This application is related to U.S. Appl. No. 13/661,736, entitled "Method and System for Symmetrical Object Profiling for One or More Objects," filed Oct. 26, 2012, which is herein incorporated by reference in its entirety.

(Continued)

*Primary Examiner* — Grace Park
*Assistant Examiner* — Aida Tessema

(57) ABSTRACT

A method for constructing a context profile within a system implementing symmetrical object profiles. The method includes establishing one or more contextual boundary parameters defining a context within which transactions occur. A plurality of transactions associated with the context is filtered using the contextual boundary parameters to obtain a pool of filtered transactions. Each of the transactions is conducted between at least two objects in the system including a plurality of objects associated with the symmetrical object profiles. An array of filtered objects including objects involved in at least one filtered transaction is established. Each filtered object is defined by a current version of a corresponding object profile and is associated with a corresponding transaction. The method includes generating a context object profile associated with the context that is based on attribute values of filtered object profiles associated with the array of filtered objects.

25 Claims, 18 Drawing Sheets

(56) References Cited

U.S. PATENT DOCUMENTS

| | | | |
|---|---|---|---|
| 2008/0004954 A1* | 1/2008 | Horvitz | 705/14 |
| 2008/0201310 A1* | 8/2008 | Fitzpatrick | G06F 17/30867 |
| 2009/0176520 A1* | 7/2009 | B. S. et al. | 455/466 |
| 2009/0248494 A1* | 10/2009 | Hueter et al. | 705/10 |
| 2009/0327081 A1* | 12/2009 | Wang | G06Q 30/02 705/14.66 |
| 2010/0262456 A1* | 10/2010 | Feng | G06Q 30/02 705/14.3 |
| 2010/0293058 A1* | 11/2010 | Maher et al. | 705/14.66 |
| 2011/0295687 A1* | 12/2011 | Bilenko | G06F 17/30528 705/14.54 |
| 2012/0095836 A1* | 4/2012 | Kendall et al. | 705/14.53 |
| 2012/0166435 A1* | 6/2012 | Graham et al. | 707/728 |
| 2012/0166540 A1* | 6/2012 | Reis et al. | 709/204 |
| 2012/0330754 A1* | 12/2012 | Foladare et al. | 705/14.61 |
| 2013/0080330 A1* | 3/2013 | Francis et al. | 705/50 |
| 2013/0318085 A1* | 11/2013 | Pepper | G06Q 10/10 707/737 |
| 2014/0244398 A1* | 8/2014 | Wasilewski | G06Q 30/0269 705/14.66 |

OTHER PUBLICATIONS

This application is also related to U.S. Appl. No. 13/661,869, entitled "Method and System for Matching Objects Having Symmetrical Object Profiling," filed Oct. 26, 2012, which is herein incorporated by reference in its entirety.

* cited by examiner

| Category | Attribute | Score |
|---|---|---|
| Gender | Male | 0.000 |
| Gender | Female | 0.000 |
| Age | Under 18 | 0.000 |
| Age | 19-25 | 0.000 |
| Age | 26-34 | 0.000 |
| Age | 35-44 | 0.000 |
| Age | 45-54 | 0.000 |
| Age | 54-65 | 0.000 |
| Age | Over 65 | 0.000 |
| Genre | Action | 0.000 |
| Genre | Romance | 0.000 |
| Genre | Thriller | 0.000 |

| Transactions 1 to n where n = cumulative # of transactions | Context Object Profile ||| Current profile of object that was previously consumed |||
|---|---|---|---|---|---|---|
| 1 | Cat. | Attribute | Score | Cat. | Attribute | Score |
| | Gender | Male | 0.500 | Gender | Male | 0.500 |
| | Gender | Female | 0.500 | Gender | Female | 0.500 |
| | Age | Under 18 | 0.600 | Age | Under 18 | 0.600 |
| | Age | 19-25 | 0.100 | Age | 19-25 | 0.100 |
| | Age | 26-34 | 0.100 | Age | 26-34 | 0.100 |
| | Age | 35-44 | 0.100 | Age | 35-44 | 0.100 |
| | Age | 45-54 | 0.100 | Age | 45-54 | 0.100 |
| | Age | 54-55 | 0.000 | Age | 54-55 | 0.000 |
| | Age | Over 65 | 0.000 | Age | Over 65 | 0.000 |
| | Gender | Action | 0.333 | Gender | Action | 0.333 |
| | Gender | Romance | 0.334 | Gender | Romance | 0.334 |
| | Gender | Thriller | 0.333 | Gender | Thriller | 0.333 |

920 — Transactions column
925 — Context Object Profile
930 — Current profile of object that was previously consumed

| Transactions 1 to n where n = cumulative # of transactions | Context Object Profile ||| Current profile of object that was previously consumed |||
|---|---|---|---|---|---|---|
| | Cat. | Attribute | Score | Cat. | Attribute | Score |
| 2 | Gender | Male | 0.300 | Gender | Male | 0.100 |
| | Gender | Female | 0.700 | Gender | Female | 0.900 |
| | Age | Under 18 | 0.350 | Age | Under 18 | 0.100 |
| | Age | 19-25 | 0.150 | Age | 19-25 | 0.200 |
| | Age | 26-34 | 0.200 | Age | 26-34 | 0.300 |
| | Age | 35-44 | 0.150 | Age | 35-44 | 0.200 |
| | Age | 45-54 | 0.100 | Age | 45-54 | 0.100 |
| | Age | 54-55 | 0.050 | Age | 54-55 | 0.100 |
| | Age | Over 65 | 0.000 | Age | Over 65 | 0.000 |
| | Gender | Action | 0.417 | Gender | Action | 0.500 |
| | Gender | Romance | 0.417 | Gender | Romance | 0.500 |
| | Gender | Thriller | 0.166 | Gender | Thriller | 0.000 |

| Cat. | Attribute | Score |
|---|---|---|
| Gender | Male | 0.100 |
| Gender | Female | 0.900 |
| Age | Under 18 | 0.100 |
| Age | 19-25 | 0.200 |
| Age | 26-34 | 0.300 |
| Age | 35-44 | 0.200 |
| Age | 45-54 | 0.100 |
| Age | 54-65 | 0.100 |
| Age | Over 65 | 0.000 |
| Genre | Action | 0.500 |
| Genre | Romance | 0.500 |
| Genre | Thriller | 0.000 |

FIG. 10

METHOD AND SYSTEM FOR CONTEXTUAL PROFILING FOR OBJECT INTERACTIONS AND ITS APPLICATION TO MATCHING SYMMETRICAL OBJECTS

CROSS REFERENCE TO RELATED APPLICATIONS

This application is related to U.S. patent application Ser. No. 13/661,736, entitled "METHOD AND SYSTEM FOR SYMMETRICAL OBJECT PROFILING FOR ONE OR MORE OBJECTS," having a filing date of Oct. 26, 2012, which is herein incorporated by reference in its entirety. This application is also related to U.S. patent application Ser. No. 13/661,869, entitled "METHOD AND SYSTEM FOR MATCHING OBJECTS HAVING SYMMETRICAL OBJECT PROFILING," having a filing date of Oct. 26, 2013, which is herein incorporated by reference in its entirety.

BACKGROUND

There are increasing numbers of distribution channels for connecting consumers with other items (e.g., products, services, content, information, etc.). For instance, the internet facilitates a communication network that joins millions of computers together. Through these distribution channels, users are able to access and search for information, make purchases of products, send and receive electronic mail, etc. As such, the internet and other distribution channels have become commonplace in the lives of the general populace.

Given these distribution channels, technology has evolved to help facilitate matching objects together, such as, the connection of a user with possibly desired items. For instance, targeting, as a form of matching, is used to connect or match various objects together, such as, advertisements and users. In practice, the delivery of advertisements to targeted users is an established technology that takes advantage of the distribution channels, wherein the advertisements are targeted to users exhibiting particular traits. In general, traits can include demographic, psychographic, consumer histories, and other user activities that help categorize or define a user. Further, traits may be compiled into a user profile that is specific to a particular user, wherein user profiles and the information contained within are used for targeting. Generally, an advertisement may be matched or targeted to a user profile exhibiting certain characteristics.

Unfortunately, there are many shortcomings to the targeting of items (e.g., advertising) to a particular group of users. These shortcomings lead to inefficient and non-effective targeting or matching. For instance, it is known that a user may have different objectives under different scenarios. That is, a user that is on the road and/or traveling may have different tastes and desires than a user that is at home relaxing. However, targeted matching of items to the user does not account for the variable tastes and desires of the user, and as such, the targeting of items would be the same to the user regardless of the circumstances the user is found.

It is desirous to have profiles that reflect varying circumstances for objects that are potentially transacting for purposes of proper matching and targeting of objects.

SUMMARY

In embodiments of the present invention, a system for matching objects together is described that implements a context object profile in a system including symmetrical object profiles across one or more objects. The system includes a profile manager that is configured for managing a plurality of object profiles associated with a plurality of objects. Each of the plurality of object profiles includes attribute valuations of a symmetrical set of attributes, wherein the plurality of objects is associated with one or more object types. The system includes a storage system configured for storing current versions of the plurality of object profiles. The system includes a context manager configured for establishing a context within which a subset of transactions of the plurality of transaction is conducted. The context is associated with a corresponding context object profile including attribute valuations for a corresponding symmetrical set of attributes, wherein the attribute valuations are based on objects conducting transactions in the subset of transactions.

In some embodiments, a non-transitory computer-readable storage medium is disclosed having stored thereon, computer-executable instructions that, when executed causes the computer system to perform a method for profiling. The method is implemented within a system comprising a plurality of objects that is associated with symmetrical object profiles, each comprising a set of attributes. The plurality of objects is associated with a plurality of object types. The method includes establishing one or more contextual boundary parameters defining a context within which one or more transactions occur. The method includes filtering a plurality of transactions using the one or more contextual boundary parameters to obtain a pool of filtered transactions associated with the context. Each of the transactions is conducted between at least two objects in the system including a plurality of objects associated with object profiles each comprising one or more attribute values. The method includes establishing an array of filtered objects comprising objects involved in at least one of the pool of filtered transactions. Each filtered object is defined by a current version of a corresponding object profile that is associated with a corresponding transaction. Also, each filtered object profile includes one or more attribute values. The method includes generating a context object profile associated with the context that is based on attribute values of filtered object profiles associated with the array of filtered objects.

In another embodiment, a computer system for implementing profiling is disclosed. The computer system includes a processor and memory coupled to the processor, and having stored therein instructions that, if executed by the computer system, cause the computer system to execute a method for profiling. The method is implemented within a system comprising a plurality of objects that is associated with symmetrical object profiles, each comprising a set of attributes. The plurality of objects is associated with a plurality of object types. The method includes establishing one or more contextual boundary parameters defining a context within which one or more transactions occur. The method includes filtering a plurality of transactions using the one or more contextual boundary parameters to obtain a pool of filtered transactions associated with the context. Each of the transactions is conducted between at least two objects in the system including a plurality of objects associated with object profiles each comprising one or more attribute values. The method includes establishing an array of filtered objects comprising objects involved in at least one of the pool of filtered transactions. Each filtered object is defined by a current version of a corresponding object profile that is associated with a corresponding transaction. Also, each filtered object profile includes one or more attribute values.

The method includes generating a context object profile associated with the context that is based on attribute values of filtered object profiles associated with the array of filtered objects.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 9A is a table illustrating an initial state of attributes for a context object profile, in accordance with one embodiment of the present disclosure.

FIG. 9B is a table illustrating state of a context object profile of FIG. 8A after a single transaction, in accordance with one embodiment of the present disclosure.

FIG. 9C is a table illustrating state of a context object profile of FIG. 8A after a second transaction, in accordance with one embodiment of the present disclosure.

FIG. 10 is an illustration of a context object profile including valuations for the various attributes included within the profile, in accordance with one embodiment of the invention.

DETAILED DESCRIPTION

Figure 1:
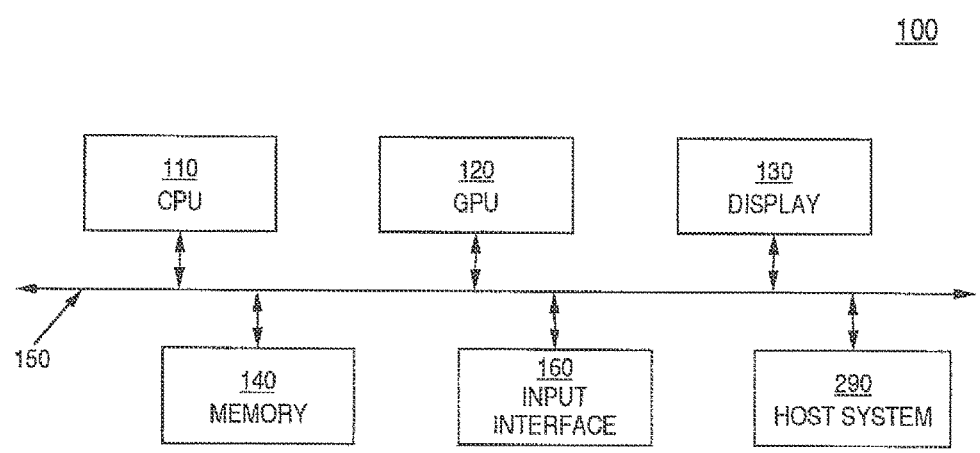
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "filtering," "determining," "accessing," "establishing," "generating," "comparing," "matching," or the like, refer to actions and processes (e.g., flowcharts 6A, 6B, 8 and 11 of FIGS. 6A, 6B, 8 and 11, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

The system 100 includes a host system 290 that is configured to manage object profiles for a plurality of objects. The host system 290 is capable of generating a context that is associated with a context profile used for matching objects, such that at three objects are considered when matching objects: a context object and at least two transaction objects. That is, when determining whether there is a good match between two objects (e.g., a video and a viewer), the context of the potential interaction scenario is calculated and used as part of the matching logic.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for a profiling and matching system that includes a context object in a transaction between matching objects, such that the potential interaction scenario is considered when matching two potential transaction objects. Other embodiments provide the above accomplishments and further provide for a profiling and matching system that includes symmetrical profiles for all objects (e.g., context object and transaction objects) and all object types to give more accurate reflections of relationships between the objects based on their interactions with each other. Still other embodiments provide the above accomplishments and further provide for a context profile that evolves over time as transaction occur within its boundary parameters, and as such, the dynamically evolving context profile provides for better accuracy when profiling and matching at least two transaction objects.

Symmetrical Object Profiling

Embodiments of the present invention are described within the environment of managing object profiles for various purposes, including transaction objects to be involved in a potential transaction. More specifically, information contained within object profiles are used to understand characteristics of objects (e.g., consumers) to deliver and/or suggest appropriate advertisements, content, and user experiences. Also, once characteristics are defined for each object, information contained within object profiles are used to match two or more objects to each other (e.g., matching an object with an advertisement, asset, experience, etc), and to perform additional analytics. Further, a context object profile is used to define a situational context within which a potential transaction may occur when matching two or more transaction objects potentially involved in a transaction. The use of the context object and its associated profile provides for increased accuracy when performing matching of transaction objects.

In embodiments of the present invention, an object profile includes psychographic information used for defining a corresponding object or grouping of objects. The psychographic information describes behavioral characteristics, such as, those for a consumer or group of consumers, and describes its or their attitudes, perceptions, and behaviors. In general, psychographic information provides insight into the personality, values, attitudes interests and lifestyles of a corresponding object or grouping of objects. With regards, to a context object, its corresponding context object profile is a reflection of the behavioral characteristics of all objects conducting transactions within a contextual boundary. As such, in one embodiment, the context object profile includes and considers current versions of object profiles. In another embodiment, the context object profile includes and considers previous versions of object profiles of those objects determined at the time of corresponding transactions, wherein each of the previous versions of object profiles reflects a state of the behavioral characteristics for a corresponding object as determined at the time of a corresponding transactions.

Additionally, an object profile includes other types of information, including demographic information in other embodiments. For instance, demographic information is used to define the characteristics and statistics of a population of a region. Examples of demographic information include gender, race, age, home ownership, employment status, location, etc. In some instances, psychographic information includes and/or uses demographic information for defining behavioral characteristics of the corresponding object or grouping of objects. For instance, age may be used to describe a psychographic makeup of a consumer, such that instead of being labeled as a 35 year old on the basis of factual data, the consumer's behaviors, attitudes and actions reflect those of someone who is 10 years older. As such, the consumer's psychographic profile would be of a 45 year old.

In embodiments of the present invention, objects within a system are each associated with symmetrical object profiles containing the same attribute information. That is, within the system, all objects (e.g., transaction objects and context objects) comprising one or more types of objects are defined by and are reflected by the same attributes, wherein objects comprise one or more types of objects (e.g., consumers, assets, products, advertisements, experiences, etc.). In that manner, any object takes on its own psychographic profile as defined by the attribute scores in its own object profile. More specifically, an inanimate object (e.g., product, asset, advertisement, experience, etc.) is defined by an object profile that is reflective of the objects (e.g., consumers) that it interacts with, such as, transactions involving two or more objects. For example, a movie as an object is defined by its object profile that is reflective of those consumers who have requested that movie, such as, in an online video content hosting site.

In another embodiment, symmetrical object profiles exist across a plurality of object types. For instance, a system including two object types (e.g., viewers and videos as content) also includes additional object types (e.g., third, fourth, and fifth types), wherein the objects spread across the five example object types are associated with corresponding symmetrical object profiles comprising the same attributes. As an example, a first object type is a user or viewer, a second object type is an article, and a third object type is an online text based article including an embedded video associated with the article. Transactions may occur between any of the objects, such as, a transaction occurs between a user and an article when the user over a web site requests the article for reading.

In another embodiment, an object type comprises a compound object representing one or more objects, or a group of objects. The group of objects is associated with a plurality of symmetrical object profiles, each represented by the same set of attributes but with varying valuations. The compound object profile is based on the object profiles associated with member objects of the corresponding group. That is, attribute valuations in the compound object profile are based on the attribute valuations of object profiles in the group of objects. For example, object profiles for each of a family of individuals combined comprise a compound object profile. As such, the family unit is defined by a separate compound object that reflects the individual components. In relation to a context object, a compound object is treated similarly for analysis and matching as any other transactional object.

Context Object Profiling

Figure 2:
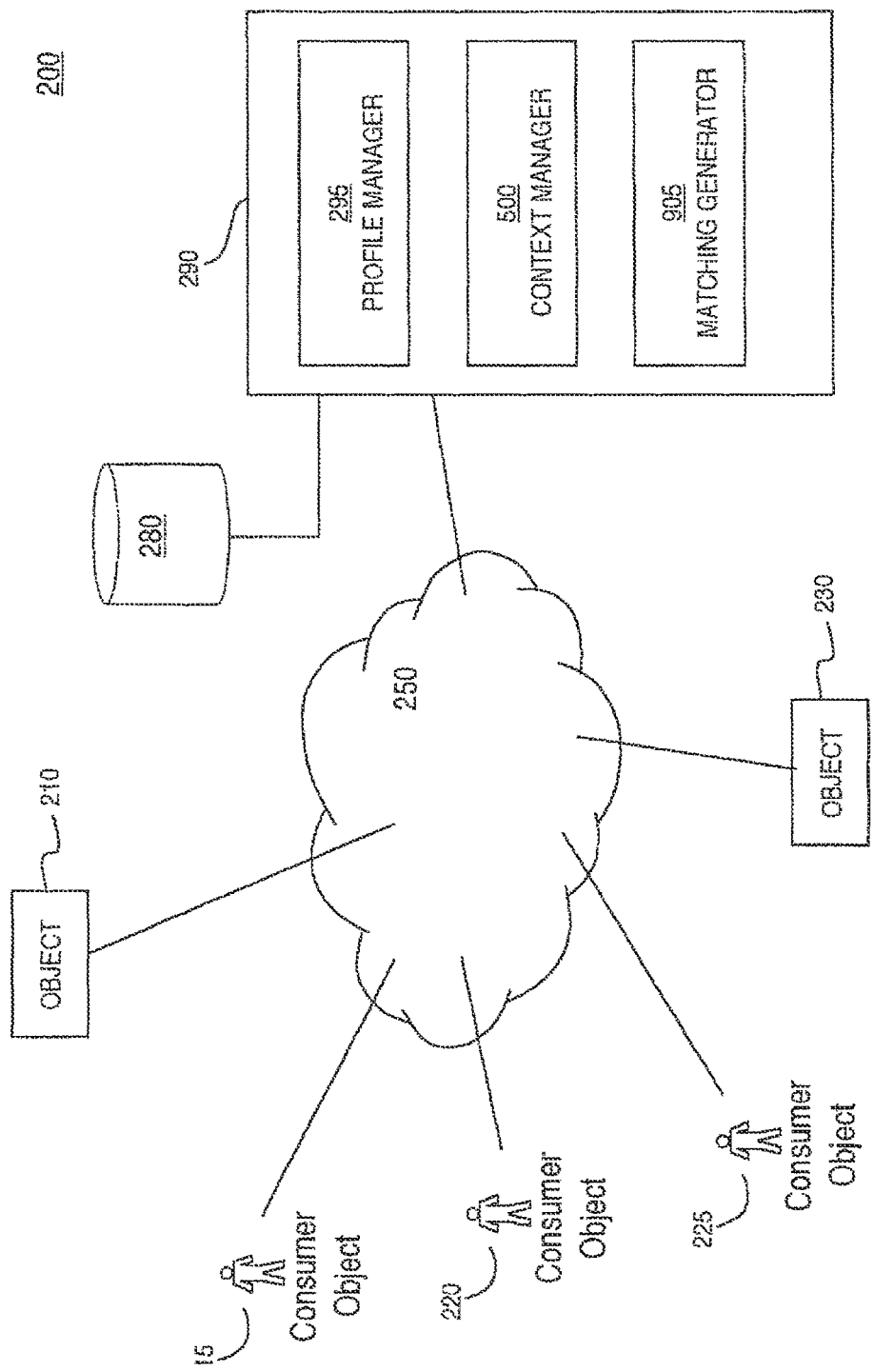
FIG. 2 is an illustration of a communication network facilitating transactions between one or more objects associated with symmetrical object profiles, in accordance with one embodiment of the present disclosure.

FIG. 2 is an illustration of a system 200 facilitating transactions between two or more objects, in accordance with one embodiment of the present disclosure. In another embodiment, the objects are associated with symmetrical object profiles. System 200 includes a communication network 250 that is capable of enabling communication between one or more objects and/or entities that are coupled to the network 250. For example, in one embodiment, the communication network 250 is the internet, but could be any suitable network capable of supporting transactions between two or more objects.

As shown in FIG. 2, generalized objects 210 and 230, as well as consumers 215, 220, 225 are coupled to communication network 250 through an associated computing resource. For illustration, consumers and/or other objects may be coupled to communication network 250 through a standalone computer, portable computer, mobile phone, smart phone, tablet, etc.).

As shown, an online platform/site or host site 290 is coupled to communication network 250. Though shown as one block, host site 290 may include one or more actual servers located in one or more locations, but act to provide server functionality to support a profiling and matching system that considers a context object when matching objects for a potential transaction, such that the potential interaction scenario is considered when matching two potential transaction objects.

For example, host site 290 is configurable to manage online content for purposes of distribution and archiving. That is, host site 290 manages, distributes, and provides access to a plurality of assets (e.g., (e.g., television/cable programs, entertainment clips, news, video content, movies, etc.) stored in repository 280 to other objects through communication network 250. For instance, host site 290 may comprise a part of a larger online entertainment service that provides for a source for users to search for and access entertainment content. In that manner, a consumer (e.g., consumer 215) may interact with host site 290 to select a movie to download for viewing. The selection by the consumer defines a transaction involving the consumer and the movie, and in embodiments of the present invention, object profiles for both the consumer and the movie are updated to reflect that transaction.

Host site 290 is configured to support a profile and matching system to facilitate matching of objects within system 200. In particular, profile manager 295 creates, manages, and stores a plurality of object profiles for objects involved in transactions handled by host system 290. For instance, a plurality of object profiles related to the assets stored in repository 280 are created, managed and stored by profile manager 295. Additionally, profile manager 295 manages object profiles for objects that interact with host site 290, including registered consumers (e.g., 215, 220, and 225) requesting assets through host site 290, and other object types (e.g., web sites, linking sites, etc.) interacting with assets controlled by host site 290. Further, the profile manager manages and stores context profiles used for matching objects.

As previously described, object profiles are symmetrical across all objects and all types of objects in a system facilitating transactions between those objects. For instance, profiles are mirrored between consumer objects, product and service asset objects, and context objects, such that a transaction between two objects is related to a context object which defines the situational context within which the transaction was conducted.

Further, the host site includes a context manager 500 that is configured to dynamically create a context that defines a situational interaction scenario within which a potential transaction may occur through proper matching. A more detailed description for the creation a context object profile is provided in relation to FIG. 5.

Also, the host site 290 includes a matching generator 905 that considers a context object when matching objects for a potential transaction. In that manner, the potential interaction scenario is considered thereby focusing on a particular context influencing the objects involved in a potential transaction. That is, the matching generator 905 matches a dynamically created context object and at least two transaction objects to be considered for a potential transaction, such that the situational context is used to refine the matching process. A more detailed description of the matching generator 905 is provided in relation to FIG. 9.

Further, storage module 280 is configurable to store the various object profiles as generated and managed by profile manager 295. As shown, storage module 280 is coupled locally to host site 290, in one embodiment. However, storage module 280 may be remotely located in other embodiments, and accessible through communication network 250. Still other embodiments are supported, wherein object profiles are stored at locations associated with a corresponding object, such as, a local computing resource.

Figure 3:
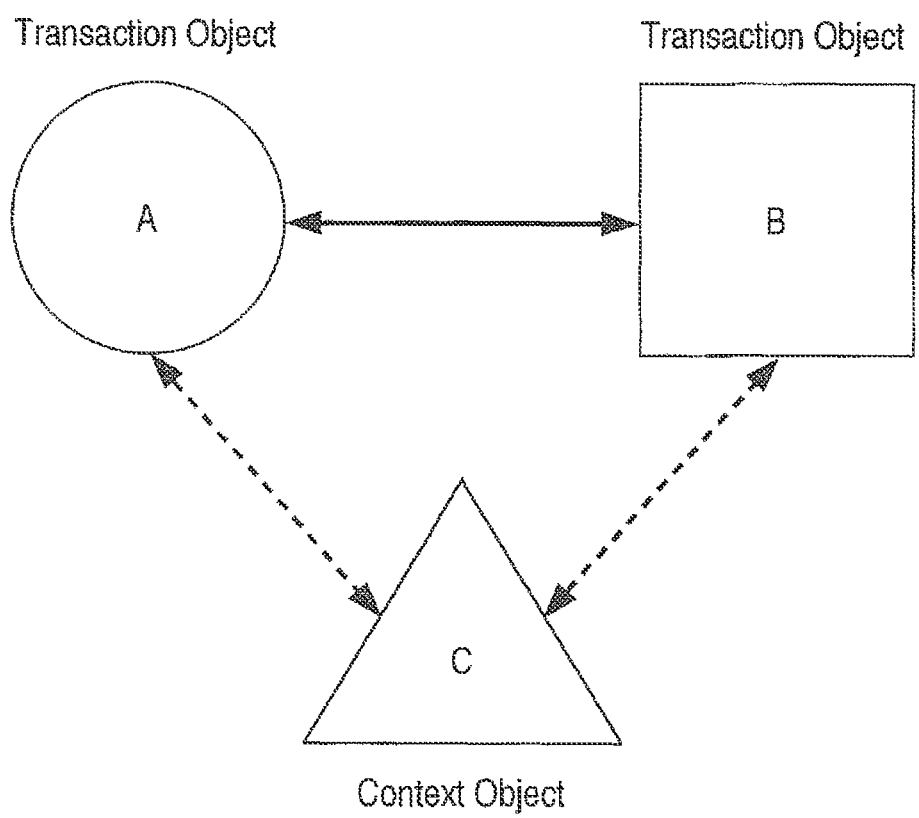
FIG. 3 is an illustration of the relationships between a context object and one or more transaction objects involved within a transaction, in accordance with one embodiment of the present disclosure.

FIG. 3 is a diagram 300 illustrating the relationships between a context object and one or more transaction objects involved within a completed transaction and/or a potential transaction, in accordance with one embodiment of the present disclosure. For example, the context object is used to define a situational interaction scenario/context within which a potential transaction may occur, and as such the context object is used to facilitate matching of two or more transaction objects.

A context object represents an instance of discrete parameter values that define a specific set of circumstances in which objects interact. As shown in FIG. 3, interacting objects are referred to as "transaction objects", wherein transaction object A is interacting with transaction object B through a corresponding transaction. The context object C is a third object used in a profiling and matching solution of embodiments of the present invention. The context object C helps determine whether two potential transaction objects (singular or compound) are a good match given certain contextual parameters that define the context.

The context profile ($C_p$) of an context object (C) evolves over time as transactions occur within its contextual boundary parameters. As such, just as transaction objects in a matching and profiling system dynamically change with each transaction, the nature of the context object is ever evolving. The dynamic nature of the context is reprinted in a context profile that is continually defined as interactions occur within the parameters of the context. The dynamic nature of the context profile $C_p$ gives a more accurate reflection of the context at any point in time, and therefore provides for more accurate matching of potential transacting objects.

When determining whether two objects are a good match, a logic method can refer to the context profile $C_p$ to refine the matching process when determining a possible match between transaction objects. As shown in FIG. 3, a transaction includes multiple objects including a context object C, and at least two transaction objects A and B. Context C is important because two objects may appear to be a good match given their respective generalized profiles, however they may not be a good match for a given context. For example, in the example of matching videos to a particular married, male consumer when performing matching without the use of a context profile, the consumer may be matched to a family movie, since the majority of movies selected by that male consumer catered to the tastes of his immediate family (e.g., young kids and wife). However, once the context is considered, the dynamically generated context profile is introduced into the matching process. For instance, the context may define a late night situation when kids are asleep. As such, the context profile may refine the matching process to match the male consumer with a romantic comedy that is more appropriate for late night viewing by the male consumer and his wife.

Figure 4:
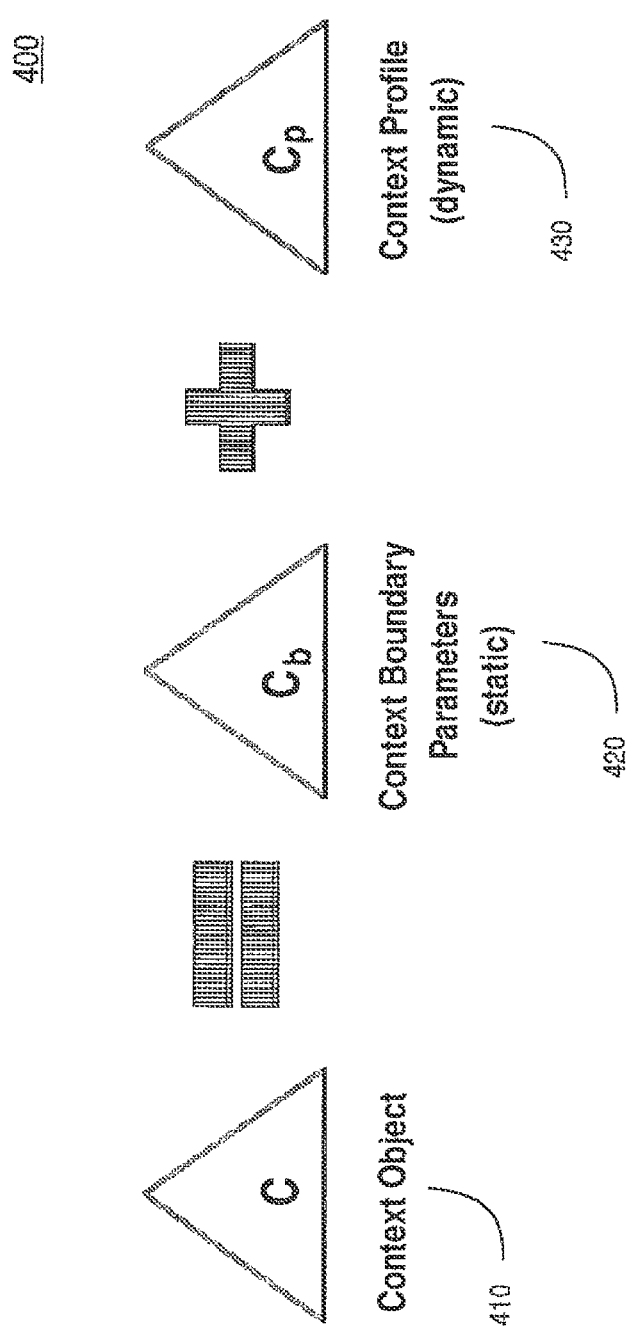
FIG. 4 is an illustration of the components of a context object, in accordance with one embodiment of the present disclosure.

FIG. 4 is a diagram 400 illustrating the components of a context object 410 used by a profiling and matching system to facilitate matching between transaction objects, such that the potential interaction scenario/context is considered when matching potential transacting objects, in accordance with one embodiment of the present disclosure. As shown, the context object 410 includes context boundary parameters ($C_b$) 420 and a dynamically evolving and generated context object profile ($C_p$) 430.

Unlike transaction object profiles, the context object profile includes context boundary parameters that are static or fixed. These parameters define the context, or situational scenario, within which a potential transaction may occur. That is, the contextual parameters define the boundaries of what constitutes a particular contextual scenario. In one embodiment, the context is associated with one transaction object, and in another embodiment, the context is associated with more than one transaction object.

In one embodiment, contextual boundary parameters include measurements in time and space. The "time" parameter points to an instance, or period of time, and includes, but is not limited to, a span of seconds, minutes, hours, days, weeks, seasons, or decades. The "space" parameter defines physical locations and/or a virtual locations. The physical location(s) may point out where the objects are located when conducting the transaction (e.g., a region, state, or country). The virtual location(s) may point out which web sites are used for selecting content, which internet service provider is used, etc. For example, when performing matching between a consumer and one or more items of video content, the contextual object profile may be defined by context boundary parameters including the approximate time of the transaction within a given range (e.g., 0200-0300 GMT), and a given location of the consumer (e.g., London, restaurant, bar, sports bar, home, etc.).

As such, contextual boundary parameters define the physical and virtual environment within which a transaction has or will occur. Examples of contextual boundary parameters other than time and place are contemplated. For instance, a parameter defines whether a consumer is alone or is with friends or family, or the willingness to spend more freely based on various reasons.

Figure 5:
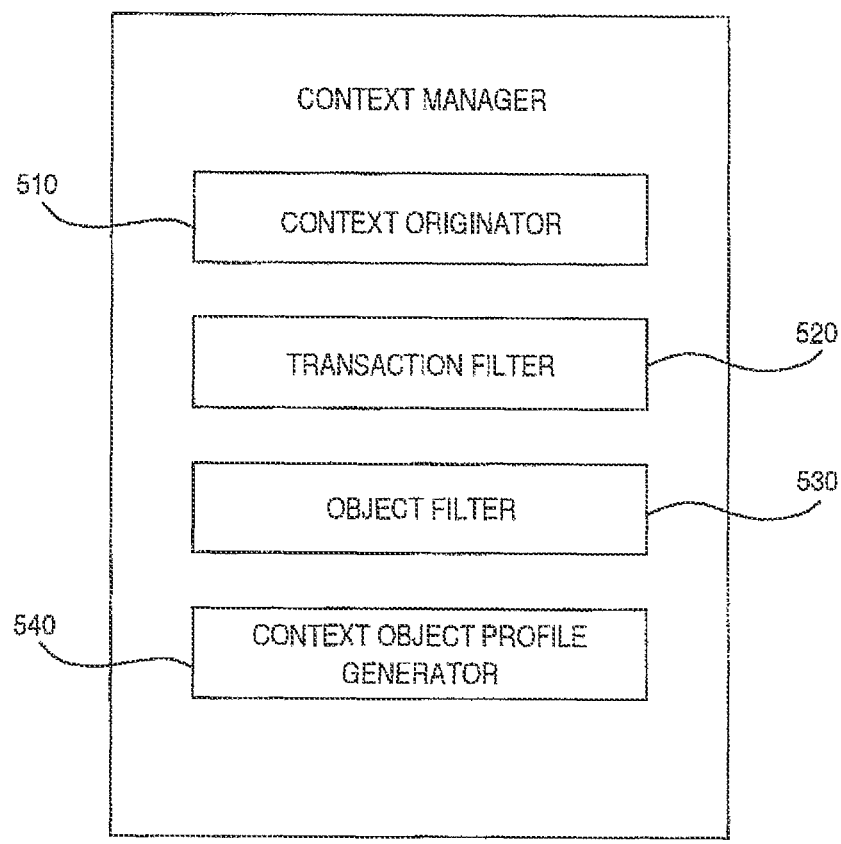
FIG. 5 is a block diagram of a context manager configured to generate a context object based on context boundary parameters, in accordance with one embodiment of the present disclosure.
Figure 6A:
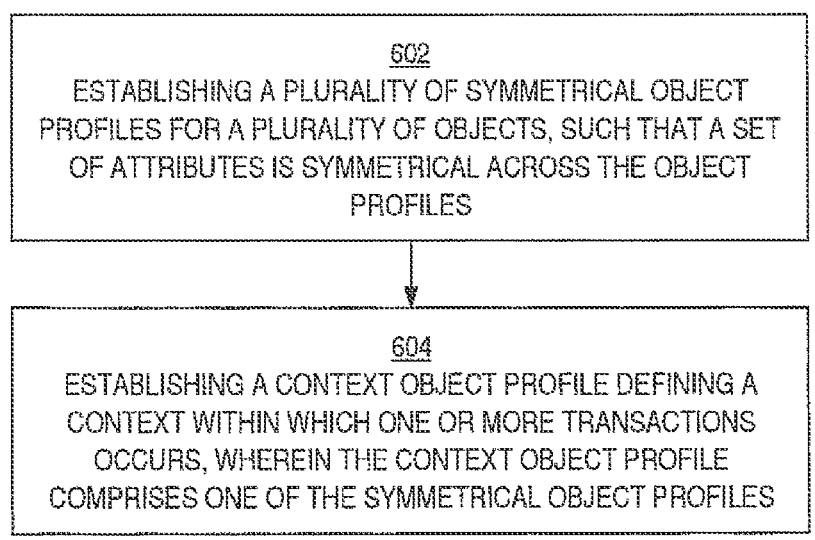
FIG. 6A is a flow diagram illustrating a computer-implemented method for profiling including the use of a context object profile for defining a context within which past, current, and future transactions occur, in accordance with one embodiment of the present disclosure.
Figure 6B:
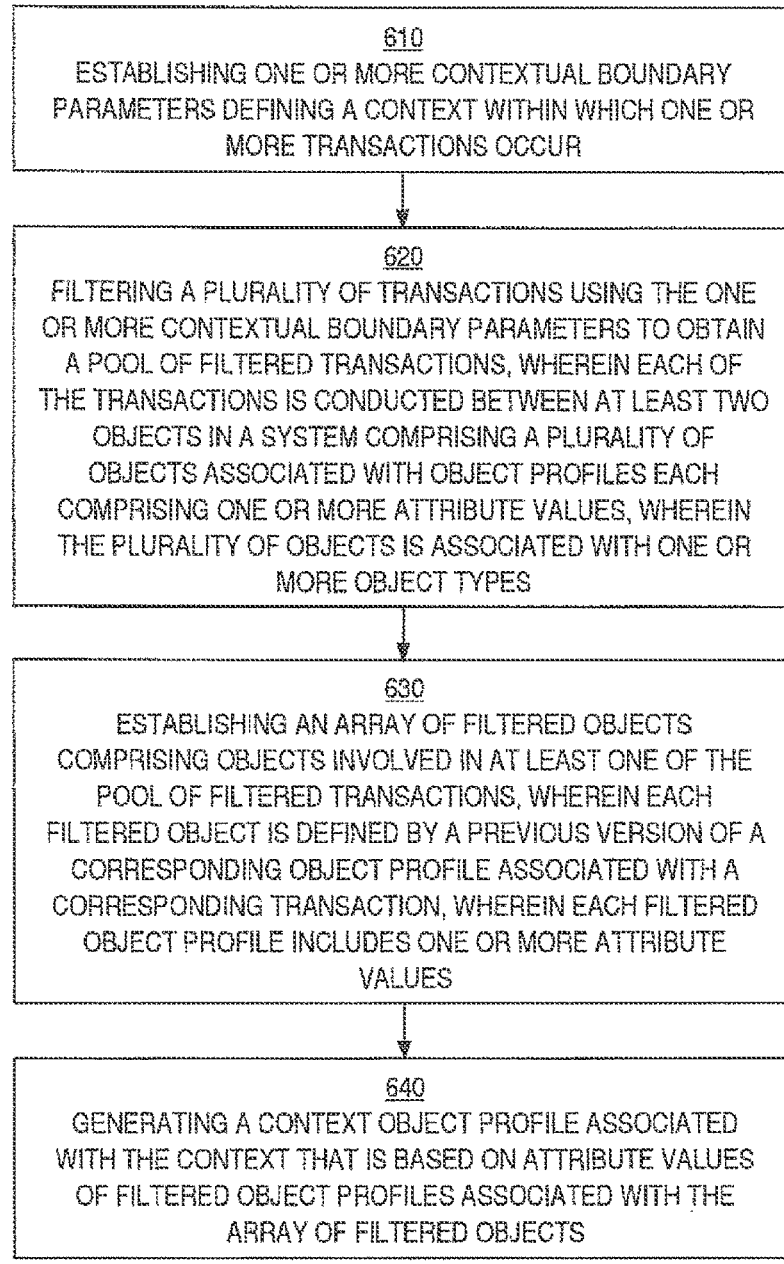
FIG. 6B is a flow diagram illustrating a method for profiling including the generation of a context object profile that is used for matching two transaction objects involved in a transaction, in accordance with one embodiment of the present disclosure.

FIGS. 5 and 6A-B combined illustrate a system for profiling and matching utilizing a contextual object and method for providing the same. As shown in embodiments described in FIGS. 5 and 6A-B, the present invention provides for incorporating a situational context to facilitate a matching between two or more transaction objects. Further, the associated context profile dynamically evolves to provide the most accurate situational context when used for matching, and further described below.

In particular, FIG. 5 is a block diagram of a context manager 500 configured to generate a context object based on context boundary parameters, in accordance with one embodiment of the present disclosure. The context object and its corresponding profile are used to define a potential interaction scenario/context to facilitate matching between potential transacting objects. Context manager is implementable by one or more components of the computer system 100 of FIG. 1, and/or host site 290 of FIG. 2 to support a profiling and matching system that includes symmetrical object profiling for its context objects and transaction objects.

As shown the context manager 500 includes a context originator 510 configured to determine and/or receive one or more contextual boundary parameters that define a context. Also, the context manager includes a transaction filter 520 for determining which transactions in a history of transactions were conducted within the context. An object filter 530 is configured to determine which objects are associated with the filtered transactions. Further, a context object profile generator 540 is configured to dynamically generate a context object profile based on the filtered transactions and filtered objects that is used to perform matching between two or more transaction objects.

FIG. 6A is a flow diagram 600A illustrating a computer-implemented method for profiling including the use of a context object profile for defining a context within which past, current, and future transactions occur, in accordance with one embodiment of the present disclosure. In another embodiment, flow diagram 600A is implemented within a computer system including a processor and memory coupled to the processor and having stored therein instructions that, if executed by the computer system causes the system to execute a method for profiling including the use of a context object profile for defining a context within which past, current, and future transactions occur. In still another embodiment, instructions for performing a method are stored on a non-transitory computer-readable storage medium having computer-executable instructions for causing a computer system to perform a method for profiling including the use of a context object profile for defining a context within which past, current, and future transactions occur. The method outlined in flow diagram 600A is implementable by one or more components of the computer system 100, host site 290, and context manager 500 of FIGS. 1, 2, and 5, respectively.

At 602, the method includes establishing a plurality of symmetrical object profiles for a plurality of objects, such that a set of attributes is symmetrical across the object profiles. That is, object profiles share the same set of attributes but attribute valuations may vary between object profiles, wherein each object profile comprises one or more attribute values. The plurality of objects is associated with one or more object types in a profiling and matching system that matches two or more objects, such as, a first object representing a consumer and a second object representing content (e.g., video, audio, etc.).

At 604, the method includes establishing a context object profile that defines a context within which one or more transactions occurs. The context object profile also comprises one of the symmetrical object profiles. Attribute valuations in the context object profile are closely related to attribute valuations for objects conducting transactions that are executed within the boundaries of the context. That is, the attribute valuations in the context object profile are predictors used for identifying objects that fall within the particular context. In that manner, attribute valuations in the context object profile are closely related to objects that have previously conducted transactions that are executed within the particular context. As such, attribute valuations in the context object profile are used to identify or match objects together that would likely conduct current or future transactions executed within the boundaries of the particular context.

FIG. 6B is a flow diagram 600B illustrating a computer-implemented method for profiling including the generation of a context object profile that is used for matching two transaction objects involved in a transaction, in accordance with one embodiment of the present disclosure. In another embodiment, flow diagram 600B is implemented within a computer system including a processor and memory coupled to the processor and having stored therein instructions that, if executed by the computer system causes the system to execute a method for profiling including the generation of a context object profile that is used for matching two transaction objects involved in a transaction. In still another embodiment, instructions for performing a method are stored on a non-transitory computer-readable storage medium having computer-executable instructions for causing a computer system to perform a method for profiling including the generation of a context object profile that is used for matching two transaction objects involved in a transaction. The method outlined in flow diagram 600B is implementable by one or more components of the computer system 100, host site 290, and context manager 500 of FIGS. 1, 2, and 5, respectively.

At 610, the method includes establishing one or more contextual boundary parameters, wherein the parameters define a context within which one or more transactions or potential transactions occur. In one embodiment, the contextual boundary parameters are determined based on the current environment within which a match is requested. For instance, a request for matching a first object (e.g., consumer) with one or more content item objects (e.g., movies, online content, etc.) is delivered within a particular context, which is definable through one or more boundary parameters.

The parameters represent a measure of time and/or space, in one embodiment. Time may include a span of seconds, minutes, hours, days, weeks, seasons, or decades. Space may include physical and/or virtual locations. In one implementation, the parameters define boundaries including time and location (e.g., virtual and physical space). As an example, boundaries for a context object may include a time boundary between 3:00-3:05 PM Easter Time (ET), conducted over a web site (e.g., nbc.com), and with consumers located in Dulles, Virginia. (time, virtual space, and physical space). In another embodiment, the contextual boundary parameters are received from an external source. In one embodiment, the context originator 510 of FIG. 5 is configured to perform the operations of 610 in order to establish the one or more contextual boundary parameters.

At 620, the method includes filtering a plurality of transactions using the one or more boundary parameters to obtain a pool of filtered transactions, each of which is associated with the context. Each of the plurality of transactions is conducted between at least two objects in a profiling and matching system including a plurality of objects. The objects in the system is associated with object profiles, each comprising one or more attribute values. Also, the plurality of objects is associated with one or more object types. Further, the transactions included within the pool of filtered transactions have been conducted under a similar context, definable by the same contextual boundary parameters.

In one embodiment, stored contextual boundary information relating to previous transactions is sorted in order to determine which of those transactions are conducted within the context as defined by the corresponding contextual boundary parameters. In one embodiment, the transaction filter 520 of FIG. 5 is configured to generate the pool of filtered transactions, each of which is associated with the corresponding context.

At 630, the method includes establishing an array of filtered objects based on the filtered transactions. More particularly, the filtered objects are involved in at least one of the pool of filtered transaction. In one embodiment, each filtered object is associated with a current version of a corresponding object profile that is associated with a corresponding transaction that occurred previously within the boundary parameters of the context. For instance, a consumer involved in a transaction occurring in the past is associated with a current consumer profile reflecting the behavioral characteristics collected and determined up to the present. The current version of the object profile is used for determining the corresponding context object profile, in one embodiment. As a result, a dynamically changing and generated context profile is generated based on historical transactions occurring within the same context, and use current versions of the objects profiles relating to objects conducting those transactions.

In another embodiment, each filtered object is defined by a previous version of a corresponding object profile that is associated with a corresponding transaction. That is, a filtered object is a previous version of a current object, but the filtered object exists in a state associated with a corresponding transaction. As previously described, a previous version of any filtered object profile includes one or more attribute values for a symmetrical object profile. In one implementation, the object filter included within the context manager of FIG. 5 is configured to determine an array of filtered objects based on the filtered transactions. More particularly, a consumer involved in a transaction occurring in the past is associated with a current consumer profile reflecting the behavioral characteristics collected and determined up to the present. However, that consumer is also associated with previous versions of that consumer profile that existed when calculated after a corresponding transaction. Those previous versions of the same consumer profile are stored along with identifying contextual information. As a result, a dynamically changing and generated context profile is generated based on historical transactions occurring within the same context, including previous versions of the objects profiles relating to objects conducting those transactions.

At 640, the method includes generating a context object profile associated with the context, wherein the profile is based on attribute values of filtered object profiles associated with the array of filtered objects. More particularly, the profile portion of the context object mirrors, in structure, the profile defined for the other objects, such as other transaction objects, in the system. That is, in one embodiment, the object profiles (e.g., transaction and context object profiles) are symmetrical in that they have the same attribute information, though their valuations for attributes may be different. For example, if each object profile in the system is comprised of gender, age, and genre attributes, then the context object profile portion is also comprised of these same attributes. In one implementation, the context object profile generator included within the context manager of FIG. 5 is configured to determine the context object profile.

In one embodiment, transaction objects in the profiling and matching system have their profiles updated after every transaction. As such, transaction object profiles are shaped by every transaction in which they are involved.

On the other hand, context objects profile calculations are determined based on transactions that occurred within the defined boundary parameter. That is, a particular context object profile is based on all transactions that occurred previously within those parameters. More particularly, the context object profile associated with the context is based on attribute valuations of the filtered object profiles that are associated with the filtered objects. As such, in one embodiment, for each transaction, the current version of the corresponding transaction object profiles is used when determining the context object profile. In another embodiment, for each transaction, corresponding transaction object profiles reflecting that transaction and states existing in association with the time period of executing that transaction are used to determine the context object profile used for matching transaction objects in a potential transaction. That is, previous versions of an object profile that reflect the state of the profile existing in association with a corresponding transaction are stored and used to determine the context object profile.

In one embodiment, the object profile is based on transactions that have occurred over a look-back range. Specifically, the look-back range is defined by a period, and as such, the plurality of transactions is limited over a look-back range for the purposes of filtering transactions considered for determining the context profile. In one implementation, the look-back range is all time. That is, all transactions in the universe of transactions (e.g., those handled by host site 290 of FIG. 2) are considered when determining the context object profile. For instance, every transaction since the inception of the system is considered. In other implementations, the look-back range is of a shorter duration. For instance, only transactions occurring within the last two years, or two months, or two days are considered.

FIGS. 7A-D are diagrams illustrating the occurrence of transactions within a system, and the implementation of a context boundary in a universe of transactions. The transactions occur within a profiling and matching system 710 that is configured to consider context when matching potential transaction objects.

Figure 7A:
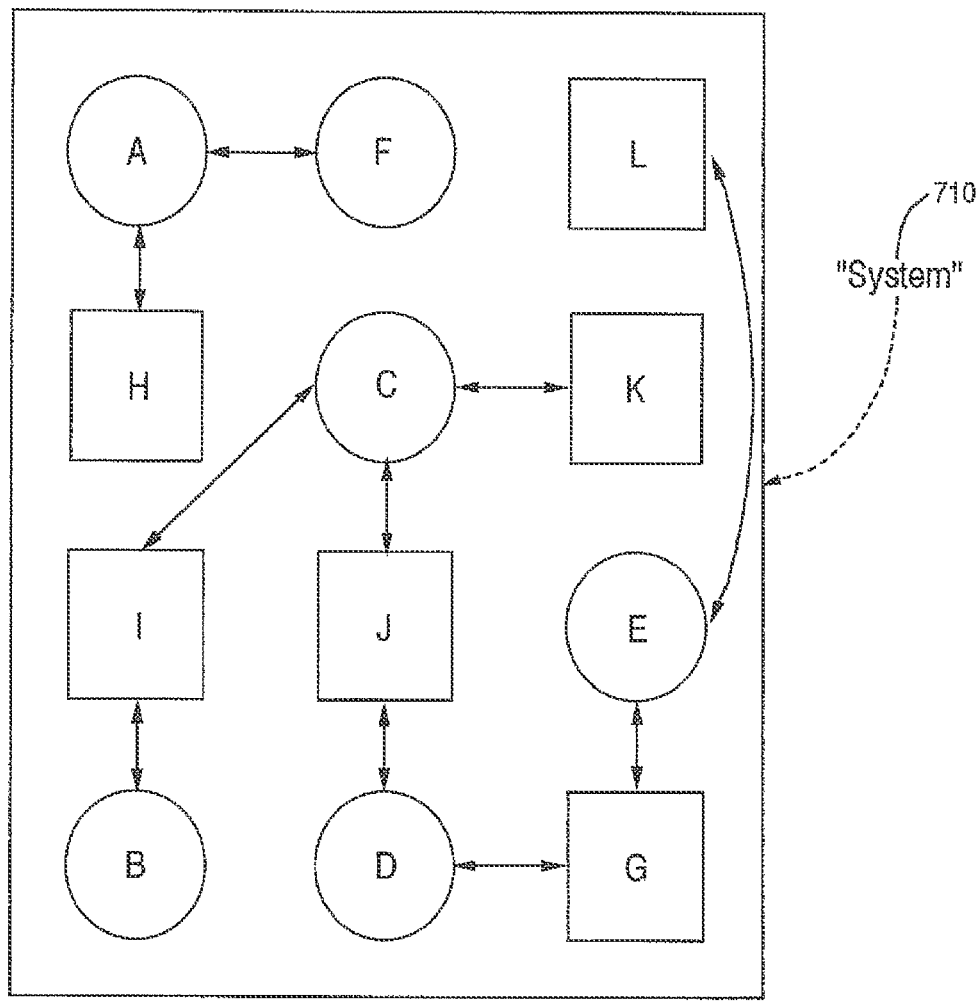
FIG. 7A is a diagram of a system including a plurality of objects conducting transactions, wherein the objects have symmetrical object profiles, in accordance with one embodiment of the present disclosure.

In particular, FIG. 7A is a diagram 700A of a profiling and matching system 710 that includes a plurality of objects conducting transactions, in accordance with one embodiment of the invention. As previously discussed, in one implementation, the objects have symmetrical object profiles, in accordance with one embodiment of the present disclosure. For instance, the transaction objects include two different types of objects differentiated by shape. A first object type is represented by the circles, and include objects, A-F. The first object type may define a consumer (e.g., a consumer interested in viewing movie content, and can be potentially matched to relevant and targeted movie content). The second object type is represented by the squares, and include objects G-L. The second object type may define content (e.g., movie, television, etc.).

As shown, object A is conducting transactions with objects F and H. In one embodiment, the first and second objects are of the same type, such as that involving objects A and F (e.g., in a person to person matching system). In other embodiments, the objects involved in a transaction are of different types, such as that involving objects A and H. Also, object C has conducted transactions with objects I, J, and K. Object D has conducted transactions with objects J and G. also, object E has conducted with transactions with K and G.

Figure 7B:
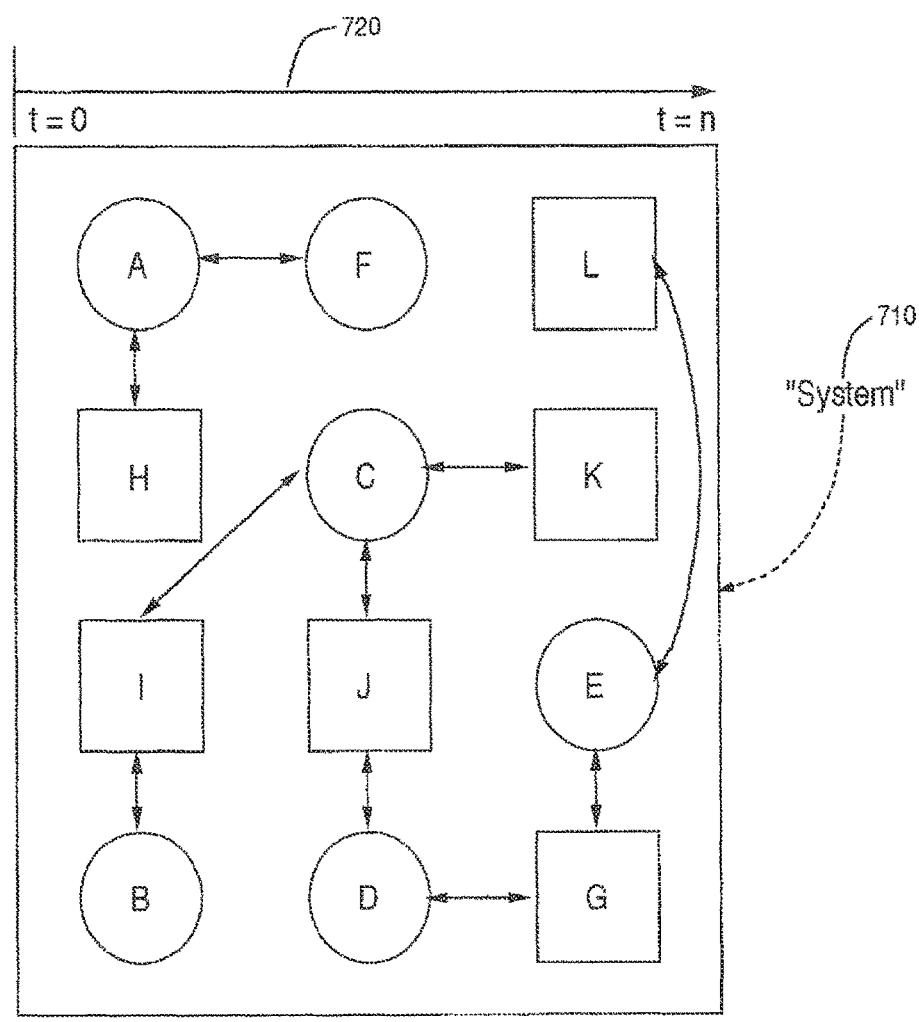
FIG. 7B is a diagram of the system shown in FIG. 7A illustrating that the transactions conducted between different objects occur along a time axis, in accordance with one embodiment of the present disclosure.

FIG. 7B is a diagram 700B of the profiling and matching system 710 shown in FIG. 7A illustrating that the transactions conducted between different objects occur along a time axis, in accordance with one embodiment of the present disclosure. That is, all transactions in the system between objects occur at a point in time (t) over a time axis 720. For instance, the transaction conducted between objects C and I occur over a period of time, and occur before the transaction conducted between objects C and K. Also, the transaction between objects E and G is occurring within a very short period of time, or instantaneously.

Figure 7C:
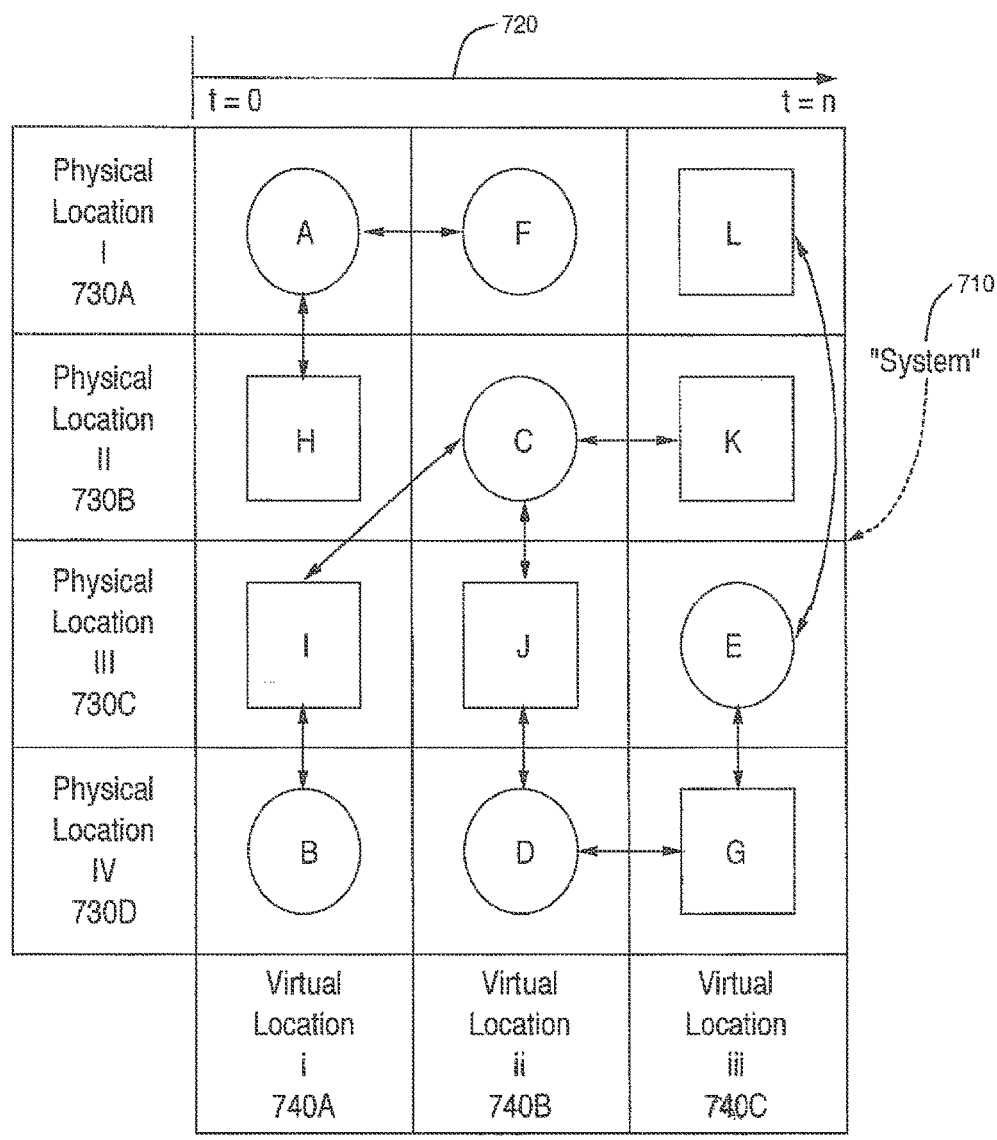
FIG. 7C is a diagram of the system shown in FIG. 7A illustrating that the transactions conducted between different objects is conducted over physical and virtual locations, in accordance with one embodiment of the present disclosure.

FIG. 7C is a diagram 700C of the profiling and matching system 710 shown in FIG. 7A illustrating that the transactions conducted between different objects is conducted over physical and virtual locations, in accordance with one embodiment of the present disclosure. That is, every transaction also occurs in a space or location(s).

It is important to note that a space or location may define a physical space (e.g., a home address) or virtual space (e.g., web site visited). For instance, objects A, F and K exist or are interacting over physical location I 730A; objects H, C, and K exist or are interacting over physical location II 730B; objects I, J and E exist or are interacting over physical location III 730C; and objects B, D, and G exist in physical location IV 730D. Also, objects A, H, I, and B exist or are interacting over virtual location i 740A; objects F, C, J, and D exist or are interacting over virtual location ii 740B; and objects L, K, E, and G exist or are interacting over virtual location iii 740C.

As shown, each of the objects are associated with both a physical and virtual location; however, as previously discussed, objects may be associated with only one of the physical and virtual locations, though not shown. For instance, object A exists or is interacting over physical location 1730A and virtual location i 740A. Additionally, each object may exist in a different space and potentially in two spaces at the same time (e.g., a video is being watched in New York City on a particular website).

Figure 7D:
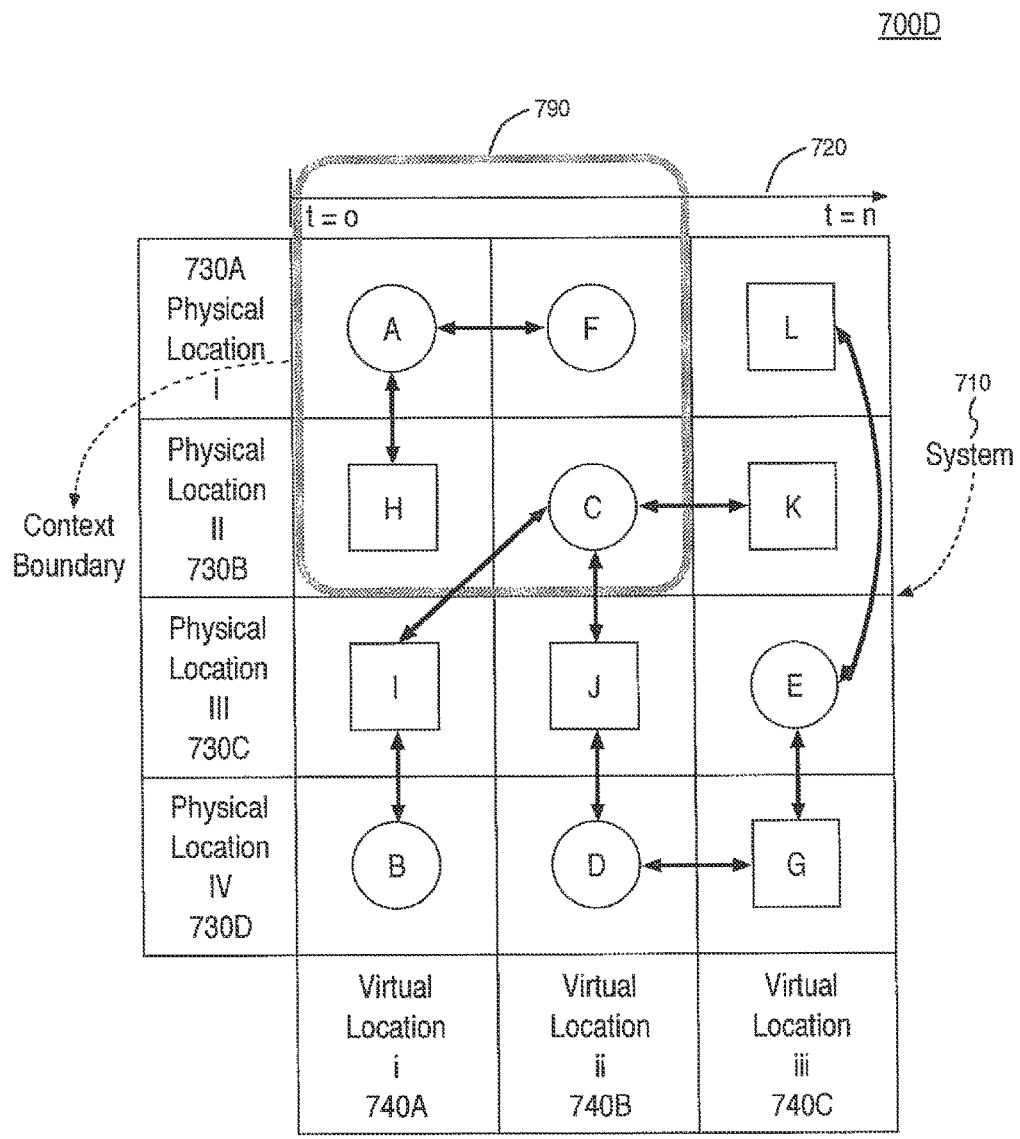
FIG. 7D is a diagram of the system shown in FIG. 7A illustrating a context boundary of a context, wherein the context boundary encompasses and defines a subset of transactions conducted within or associated with the context, in accordance with one embodiment of the present disclosure.

FIG. 7D is a diagram 700D of the profiling and matching system 710 shown in FIG. 7A illustrating a context boundary 790 of a context, wherein the context boundary encompasses and defines a subset of transactions conducted within or associated with the context, in accordance with one embodiment of the present disclosure. That is, a particular instance of context boundary parameters introduces a contextual boundary (e.g., boundary 790). The boundary parameters are crucial to determining the context profile as they delineate which transaction object profiles are used. More particularly, the contextual boundary defines a pool of filtered transactions determined from all the transaction occurring within the profiling and matching system 710. For instance, as shown in FIG. 7D, filtered transactions in the pool include the following: transactions between objects A and H; A and F; and transactions involving object C (e.g., C and I; C and J; and C and K) though not including the corresponding partner objects (e.g., I, J and K).

It is within the contextual boundary that a context object profile is determined based on all the transaction activity that has previously occurred between objects, as defined by the contextual boundary parameters. That is, previous versions of transaction object profiles that reflect the state of the profile existing in association with a corresponding transaction are stored and used to determine a corresponding context object profile.

Figure 8:
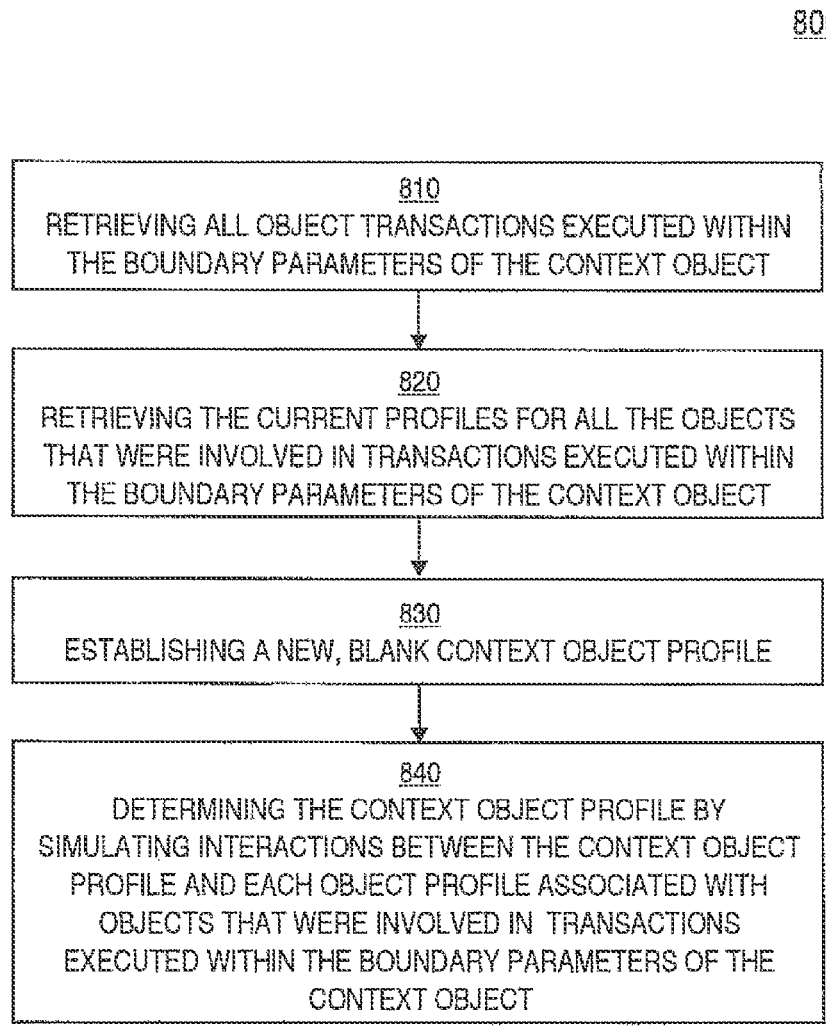
FIG. 8 is a flow diagram illustrating a method for determining attribute valuations for a context object, in accordance with one embodiment of the invention.

FIG. 8 is a flow diagram 800 illustrating a computer-implemented method for profiling including determining attribute valuations for a context object profile, in accordance with one embodiment of the invention. In another embodiment, flow diagram 800 is implemented within a computer system including a processor and memory coupled to the processor and having stored therein instructions that, if executed by the computer system causes the system to execute a method for profiling including determining attribute valuations for a context object profile. In still another embodiment, instructions for performing a method are stored on a non-transitory computer-readable storage medium having computer-executable instructions for causing a computer system to perform a method for profiling including determining attribute valuations for a context object profile. The method outlined in flow diagram 800 is implementable by one or more components of the computer system 100, host site 290, and context manager 500 of FIGS. 1, 2, and 5, respectively.

At 810, the method includes retrieving all object transactions executed within the contextual boundary parameters. That is, a plurality of transactions conducted within the profiling and matching system if filtered using the contextual boundary parameters to obtain a pool of filtered transactions.

At 820, the method includes retrieving the current profiles for all the objects that were involved in at least one of the filtered transactions. For example, in a system matching consumers with video as facilitated by a host site (e.g., host site 290 of FIG. 2), a transaction may include a consumer viewing a particular video, or more than one video.

In another embodiment, the method includes retrieving previous profiles for objects that were involved in at least one of the filtered transactions. For instance, a previous version of a transaction object profile reflects a state of the profile existing in association with a corresponding transaction, and is used to determine a corresponding context object profile.

At 830, the method includes establishing a new, blank, context object profile that mirrors the attributes (not their valuations) and categories of its member objects. For instance, the profiling and matching system supports objects with symmetrical object profiles having similar attributes. For example, FIG. 9A is a Table 900A illustrates a blank context object profile mirroring the attributes of other transaction objects in the profiling and matching system, in accordance with one embodiment of the invention. That is, Table 900A illustrates an initial state of attributes for a context object profile, wherein the profile is symmetrical with other transaction object profiles in the profiling and matching system.

As shown, the context object profile includes one or more attributes as defined by attribute column 910, each defining a particular characteristic. Attribute valuations can take on a sliding scale within a category. That is, valuations may be greater than 0 for one or more attributes within a given category, as long as attribute valuations within a given category total 100 percent, or a representative 1.000. Attributes are further grouped into one or more categories, as defined by category column 905. For instance, for purposes of illustration only, categories in the context object profile include those describing or defining gender, age, and movie genre. Other groupings of the same or different categories and/or attributes may define other declared compound object profiles. Further, valuations for each attribute in their various categories for the object profile is provided in scoring column 915. In its initial state, attribute values for the context object profile each have a zero value.

At 840, the method includes determining the attribute valuations for the context object profile by simulating the interactions between the context object profile and each object profile. FIG. 9B illustrates the attribute valuations for the context object profile. In particular, for each filtered transactional object profile associated with the array of filtered objects, valuations for each of the set of attributes is accessed. For each attribute, a valuation is generated based on valuations for the corresponding attribute, wherein the valuations are associated with profiles of each of the array of filtered objects. In one embodiment, the valuation is determined for an attribute by averaging valuations associated with each of the array of filtered objects for the corresponding attribute.

For instance, FIG. 9B is a Table 900B illustrating state of a context object profile of FIG. 9A after a simulated transaction between the context object and an object from the array of filtered objects, in accordance with one embodiment of the invention. As shown, Table 900B includes column 920 which lists the number of transactions (e.g., now numbering "one") considered when determining attribute valuations for the context object profile.

Table 900B includes column 925 which illustrates a context object profile of FIG. 9A, but now after a single transaction. In the symmetrical object profile for the context object profile provided in column 925, one or more attributes are provided, each defining a particular characteristic. Attributes are further grouped into one or more categories, such as, those defining gender, age, and movie genre.

Table 900B includes column 930, which illustrates a transaction object profile of an object included within the array of filtered objects. As shown, the profile is the current profile of the object, in one embodiment. In another embodiment, the profile is the previous version of the profile that reflects the state of the profile existing in association with a corresponding transaction. The object profile includes the same set of attributes and categories of attributes as that provided for the context object profile in column 925, and that provided in FIG. 9A, as they are included in a profiling and matching system with symmetrical object profiles.

As shown in FIG. 9B, after a single transaction, the context object profile provided in column 925 assumes the attribute scores of the transaction object in a simulated transaction. That is, the scores provided in the context object profile provided in column 925 are equivalent to the scores provided in the transaction object profile illustrated in column 930. More specifically, because it is the first transaction, through simultaneous profile updating, the attribute score is equal to the total score divided by the number of transactions. In the present embodiment, the number of transactions is one. As such, the scores are mirrored between the context object profile in column 925 and the object profile of column 930.

The process is included for each simulated transaction with transaction objects included in the array of filtered objects. For instance, FIG. 9C illustrates attribute valuations for the context object profile after two transactions. Specifically, FIG. 9C is a Table 900C illustrating the state of the context object profile of FIG. 9A after two simulated transactions have occurred between one or more transaction objects of the array of filtered objects, in a system of multiple objects associated with symmetrical object profiles having different valuations, in accordance with one embodiment of the present disclosure. As shown, Table 900C includes column 920 which lists the number of transactions considered (e.g., now numbering "two"). Table 900C includes column 940 which illustrates a context object profile of FIGS. 9A-B, but now after two transactions. In the symmetrical object profile for the context object profile provided in column 940, one or more attributes are provided, each defining a particular characteristic. Attributes are further grouped into one or more categories, such as, those defining gender, age, and movie genre.

Table 900C includes column 945, which illustrates an object profile of a transaction object that was involved a transaction falling within the contextual boundary as defined by the contextual boundary parameters. A simulated transaction between the transaction object profile and the context object profile is the second transaction with the context object. The transaction object profile includes the same set of attributes and categories of attributes as that provided for the context object profile in column 940, and that previously provided in FIGS. 9A-B, as they are included in a profiling and matching system with symmetrical object profiles.

As shown in FIG. 9C, after two transactions, the context object profile provided in column 940 adjusts the scores or valuations for the attributes in the context object profile. For example, in Table 900C, the context object profile includes a gender category 943 that includes two attributes: male attribute and female attribute. The corresponding psychographic profile of the compound object may reflect on the one hand a combination of male and female characteristics, or on the other hand be more skewed towards a male or female characteristic.

In determining the valuation of the male attribute, valuations for the male attribute for transaction object profiles in the array of filtered objects are considered and are further based on the number of transaction conducted. In one embodiment, the new valuation is determined by summing the valuations for the male attributes for all objects involved in the previously described simulated transactions and divided by the number of transactions. In the example provided in FIGS. 9A-C, there are two transactions, and the new valuation for the male attribute is determined, as follows: (0.500+0.100)/2=0.300. Similarly, the new valuation for the female attribute is determined, as follows: (0.500+0.900)/2=0.700.

The process for incorporating each of the attribute valuations associated with transaction object profiles in the array of filtered objects is repeated until the context object profile reflects the simulated effect of having transacted with each of the transaction objects.

It is important to note that the context object profile exists independently of the transaction object profiles. In addition, the context object profile is not an average of the transaction object profiles. Rather, the context object profile is determined independently based on the transactions of the profiles of the array of filtered objects. Further, current profiles for filtered objects are used in one embodiment, or previous versions of the profiles for filtered objects may be used. Also, when determining the context object profile, there is no effect on the individual transaction object profiles.

Matching Objects in a System Using a Context Object

Various analytics are performed once object profiles are established and/or generated within a system comprising a plurality of objects associated with a plurality of symmetrical object profiles, each with varying attribute valuations. For instance, matching between one or more objects in the system is performed based on attribute valuations in the transaction object profiles and context object profile.

A context object profile provides a description of the prevalent attributes, and respective degrees, for a particular time and space defining an attribute in a profiling and matching system that includes a context object in a transaction between transaction objects, such that the potential interaction scenario is considered when matching two potential transaction objects.

For example, context object profile 1000 illustrated in FIG. 10, which shows the "3:00-3:15 PM EST/nbc.com/ Dulles, Virginia" object, the gender skews heavily towards women (at 90 percent), slightly towards the 26-34 age range (at 30 percent), and evenly between action and romance content (50 percent each). Embodiments of the present invention make recommendations for matches between transaction objects by assessing whether a second object (e.g., film or video) is a good match for a first object (e.g., consumer or compound object), to watch under a given or experienced context (e.g., certain time and/or space).

If the profiling and matching system is seeking likely positive matches between two transaction objects in a system for the stated context ("3:00-3:15 PM EST/nbc.com/ Dulles, Virginia"), the context profile gives guidance on the types of objects that are most applicable in this scenario—rather than only relying on matching the respective transaction object profiles. That is, a third object profile, associated with the context object, is considered along with the one or more transaction objects.

Figure 11:
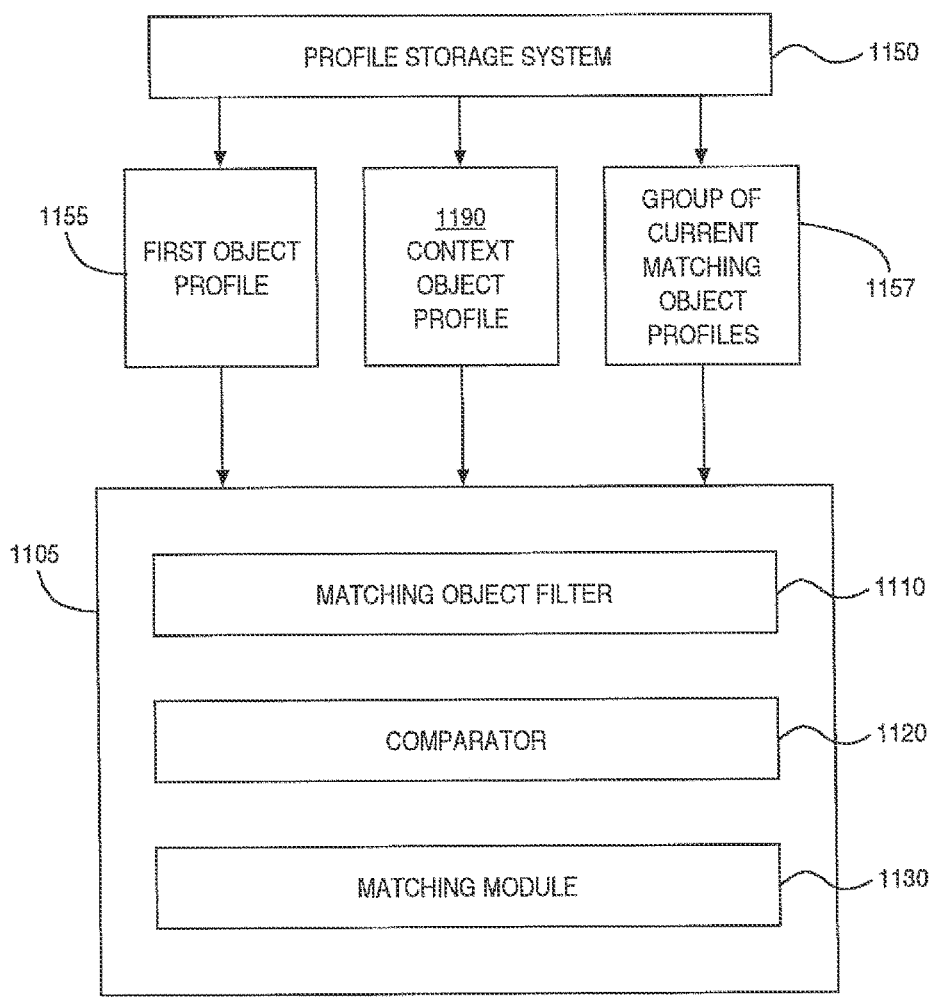
FIG. 11 is a block diagram of a matching system configured to match objects within a particular context in an object profiling system implementing symmetrical object profiles across one or more transaction objects and a context object, in accordance with one embodiment of the present disclosure.

FIG. 11 is a block diagram of a system 1100 configured to match transaction objects within a given context that are associated with symmetrical object profiles, in accordance with one embodiment of the present disclosure. That is, system 1100 is implemented within a profiling and matching system that includes a plurality of objects associated with symmetrical object profiles (e.g., sharing the same set of attributes) having different attribute valuations across the object profiles. In addition, the plurality of objects is comprised of a plurality of types of objects, all based on the same symmetrical object profiling system.

As shown in FIG. 11, system 1100 is used for matching one or more objects together and includes a profile storage system 1150 that stores a plurality of object profiles (e.g., current and previous versions). For instance, the profile storage system stores a first object profile 1155 that is associated with a first object. The first object profile 1155 comprises a first set of valuations for the set of attributes associated with the symmetrical object profiles. For example, the first object profile 1155 is associated with a consumer. System 1100 also is able to determine and/or store the context object profile 1190, previously discussed.

In addition, the profile storage system 1150 also includes a group of current matching object profiles 1157 that is associated with an array of filtered objects, wherein the filtered objects are associated with transactions conducted within the contextual boundary parameters of the given context. The group of current matching transaction profiles is selected for purposes of matching. For instance, the group of transaction object profiles may be associated with a group of assets (e.g., advertisements, video assets, etc.), each of which is capable of being matched to the first object (e.g., consumer). Embodiments of the present invention provide for selecting the best matching object for matching with any object (e.g., the first object).

Also shown in FIG. 11 is a matching system 1105 that is configured to match one or more objects together. In particular, matching system 1105 includes a matching object filter 1110, comparator 1120, and a matching module 1130.

The matching object filter is configured for filtering a plurality of transaction objects of a second object type (e.g., video content) by the context object profile to obtain a narrowed set of matching objects that is associated with an array of filtered transaction objects for purposes of matching two or more transaction objects together for a given context.

For example, comparator 1110, compares attributes in the first set of attribute valuations for the first object against and/or with attributes in corresponding matching object profiles associated with the plurality of matching objects. A comparison is made between the respective object profiles to determine a relationship between the first object and each of the matching objects based on object profiling.

Further, matching system 1105 includes a matching module 1130 that is configured for determining a first matching object profile comprising attributes closest to the first set of valuations for the first object. The matching module 1130 also matches the first object to the first matching object based on which matching object profile has the closest relationship with the first object based on attribute valuations in both symmetrical object profiles.

Figure 12:
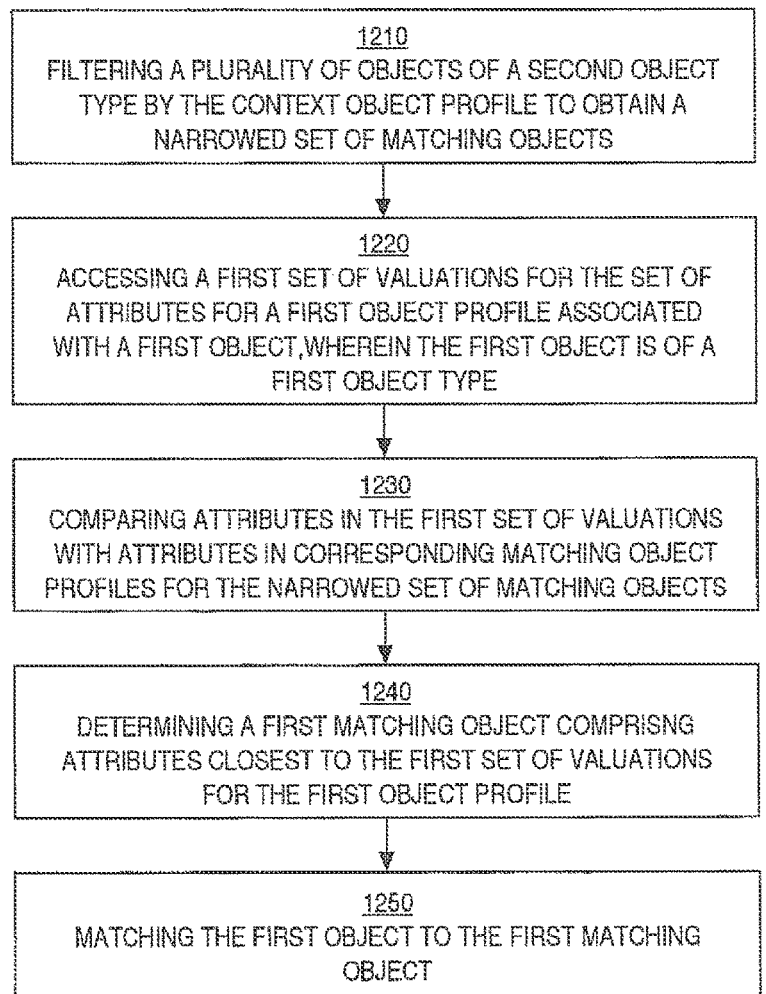
FIG. 12 is a flow diagram illustrating a method for matching objects within a particular context in a system implementing symmetrical object profiles across one or more transaction objects and a context object, in accordance with one embodiment of the present disclosure.

FIG. 12 is a flow diagram 1200 illustrating a computer-implemented method for matching objects within a particular context in a system implementing symmetrical object profiles across one or more transaction objects and a context object, in accordance with one embodiment of the present disclosure. In one embodiment, flow diagram 1200 is implemented within a computer system including a processor and memory coupled to the processor and having stored therein instructions that, if executed by the computer system causes the system to execute a method for matching objects within a particular context in a system implementing symmetrical object profiles across one or more transaction objects and a context object. In still another embodiment, instructions for performing a method are stored on a non-transitory computer-readable storage medium having computer-executable instructions for causing a computer system to perform a method for matching objects within a particular context in a system implementing symmetrical object profiles across one or more transaction objects and a context object. The method outlined in flow diagram 1200 is implementable by one or more components of the computer system 100, host site 290 of system 200, and system 1100 of FIGS. 1, 2, and 11 respectively.

The method outlined in FIG. 12 is implemented to match objects in a profiling system comprising a plurality of objects associated with symmetrical object profiles, each comprising a set of attributes. Additionally, the plurality of objects is associated with a plurality of object types.

In particular, at 1210, the method includes filtering a plurality of objects of a second object type by said context object profile to obtain a narrowed set of matching objects. For instance, the matching objects include objects in the array of filtered objects each of which is associated with transactions that fall within a given context and/or contextual boundaries associated with the context. The narrowed set of matching objects is used for purposes of matching at least one of the objects of the second object type with a first object profile associated with a first object of a first object type (e.g., consumer).

At 1220, the method includes accessing and/or receiving a first set of valuations for the set of attributes for a first object profile that is associated with the first object of a first object type. For instance, for purposes of illustration, the first object is associated with a consumer who is requesting or is to be matched with a second object type (e.g., a video asset or advertisement, etc.).

More specifically, at 1230, the method includes comparing attributes in the first set of valuations associated with the first object profile, with attributes in corresponding matching object profiles for the array of filtered transaction objects. That is, for a particular transaction object profile, attributes valuations for each valuation in the symmetrical object profiles are compared.

In one embodiment, attribute comparison is performed for each of the array of filtered transaction objects, such that attributes are compared between the first object profile and each transaction object profile to be considered for matching. The comparison includes determining a second set of valuations for the set of attributes for a corresponding transaction object profile to be considered for matching. The transaction object profile includes the same attributes as found in the first object profile in a system of symmetrical object profiles.

Further, for each attribute in the set of attributes, a variance is determined between a first valuation associated with the first object profile, and a second valuation associated with the corresponding transaction object profile considered for matching. That is, the variance is determined by subtracting the second valuation from the first valuation. In one embodiment, the variance calculated is an absolute value of the difference between the second valuation from the first valuation.

At 1240, the method includes determining a first matching transaction object comprising attributes that are closest to the first set of valuations for attributes in the first object profile. In particular, for each of the array of filtered transaction objects, a plurality of total variances is determined that is associated with the plurality of matching object profiles. That is, each total variance corresponds to a transaction object considered for matching (e.g., included within the array of filtered transaction objects) and the variances determined between attribute valuations between the first object profile and the corresponding transaction object profile.

In one embodiment, the total variance for a corresponding transaction object profile considered for matching is determined by totaling variances across the set of attributes. That is, absolute values for variances for corresponding attributes in the set of attributes, as determined from valuations found in the first object profile and the corresponding transaction object profile, are summed to determine the total variance for a corresponding transaction object profile considered for matching. In that manner, the total variance is determined for every matching object profile in the group.

In one embodiment, the first matching transaction object is determined by selecting the least total variance from the plurality of total variances associated with the array of filtered transaction objects and their associated object profiles. The least total variance is associated with the first matching transaction object, such that the first object and the first matching transaction object are matched together at 1250 because the first object has the closest relationship with the first matching transaction object in comparison to other transaction objects in the array of filtered transaction objects.

Thus, according to embodiments of the present disclosure, systems and methods are described for matching transaction objects together in a system that considers the context within which a potential transaction may occur.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A non-transitory computer-readable medium having computer executable instructions for performing a method for recommending objects, the method comprising:
    storing a plurality of symmetrical objects and a plurality of past selections, the plurality of symmetrical objects including a plurality of consumer objects and a plurality of inanimate objects, the plurality of symmetrical objects having attribute names that match, each attribute name having a value, and each past selection including two or more symmetrical objects;
    determining a time range, a location, and a consumer object based on received consumer information, the consumer object being one of the plurality of symmetrical objects;
    identifying a plurality of filtered selections from the plurality of past selections, the plurality of filtered selections having been selected in the past during the time range and from the location, the plurality of filtered selections including a plurality of filtered objects, each filtered object being one of the plurality of symmetrical objects;
    determining a plurality of total differences for the plurality of filtered objects such that a total difference is determined for each filtered object, determining the plurality of total differences including:
        for each filtered object,
            determining a plurality of attribute differences such that an attribute difference is determined for each attribute name of a filtered object, each attribute difference being a difference between a value of an attribute name of the consumer object and a value of a corresponding attribute name of the filtered object; and
            summing the plurality of attribute differences to determine the total difference for the filtered object; and
    selecting the filtered object that has a smallest total difference to be a recommended object.

2. The non-transitory computer-readable medium of claim 1, wherein
    the plurality of filtered objects are consumer objects or inanimate objects.

3. The non-transitory computer-readable medium of claim 1, wherein
    the values of the attribute names of the filtered objects are values currently associated with the attribute names.

4. The non-transitory computer-readable medium of claim 1, wherein the values of the attribute names of a filtered object associated with a filtered selection reflect the values present when the filtered selection was made.

5. The non-transitory computer-readable medium of claim 1, wherein the plurality of past selections is limited to a look-back period.

6. The non-transitory computer-readable medium of claim 1, wherein
    the location includes a physical location and a virtual location; and
    the plurality of consumer objects includes psychographic information.

7. The non-transitory computer-readable medium of claim 1, wherein
    the plurality of filtered selections is identified with a context object, the context object having a plurality of attribute names, each attribute name of the context object having a value that is equal to an average value of the corresponding attribute names of the plurality of filtered objects.

8. The non-transitory computer-readable medium of claim 1, and further comprising transmitting the recommended object to a consumer device associated with the consumer object.

9. The non-transitory computer-readable medium of claim 8, wherein the values of the attribute names of the consumer object and the values of the attribute names of the filtered object selected as the recommended object are modified if the recommended object is selected.

10. A method of recommending objects comprising:
    storing a plurality of symmetrical objects and a plurality of past selections, the plurality of symmetrical objects including a plurality of consumer objects and a plurality of inanimate objects, the plurality of symmetrical objects having attribute names that match, each attribute name having a value, each past selection including two or more symmetrical objects;
    determining a time range, a location, and a consumer object based on received consumer information, the consumer object being one of the plurality of symmetrical objects;
    identifying a plurality of filtered selections from the plurality of past selections, the plurality of filtered selections having been selected in the past during the time range and from the location, the plurality of filtered selections including a plurality of filtered objects, each filtered object being one of the plurality of symmetrical objects;
    determining a plurality of total differences for the plurality of filtered objects such that a total difference is determined for each filtered object, determining the plurality of total differences including:
        for each filtered object,
            determining a plurality of attribute differences such that an attribute difference is determined for each attribute name of a filtered object, each attribute difference being a difference between a value of an attribute name of the consumer object and a value of a corresponding attribute name of the filtered object; and
            summing the plurality of attribute differences to determine the total difference for the filtered object; and
    selecting the filtered object that has a smallest total difference to be a recommended object.

11. The method of claim 10, wherein the plurality of filtered objects are consumer objects or inanimate objects.

12. The method of claim 10, wherein
the values of the attribute names of the filtered objects are values currently associated with the attribute names.

13. The method of claim 10, wherein the values of the attribute names of a filtered object associated with a filtered selection reflect the values present when the filtered selection was made.

14. The method of claim 10, wherein
the location includes a physical location and a virtual location; and
the plurality of consumer objects includes psychographic information.

15. The method of claim 10, wherein the plurality of filtered selections is identified with a context object, the context object having a plurality of attribute names, each attribute name of the context object having a value that is equal to an average value of the corresponding attribute names of the plurality of filtered objects.

16. The method of claim 10, further comprising
transmitting the recommended object to a consumer device associated with the consumer object, wherein the values of the attribute names of the consumer object and the values of the attribute names of the filtered object selected as the recommended object are modified if the recommended object is selected.

17. The method of claim 10, wherein the plurality of past selections is limited to a look-back period.

18. A computer system comprising:
a processor; and
a memory coupled to the processor and having stored therein instructions that, if executed by the computer system, cause the computer system to execute a method comprising:
storing a plurality of symmetrical objects and a plurality of past selections, the plurality of symmetrical objects including a plurality of consumer objects and a plurality of inanimate objects, the plurality of symmetrical objects having attribute names that match, each attribute name having a value, each past selection including two or more symmetrical objects;
determining a time range, a location, and a consumer object based on received consumer information, the consumer object being one of the plurality of symmetrical objects;
identifying a plurality of filtered selections from the plurality of past selections, the plurality of filtered selections having been selected in the past during the time range and from the location, the plurality of filtered selections including a plurality of filtered objects, each filtered object being one of the plurality of symmetrical objects;
determining a plurality of total differences for the plurality of filtered objects such that a total difference is determined for each filtered object, determining the plurality of total differences including:
for each filtered object,
determining a plurality of attribute differences such that an attribute difference is determined for each attribute name of a filtered object, each attribute difference being a difference between a value of an attribute name of the consumer object and a value of a corresponding attribute name of the filtered object; and
summing the plurality of attribute differences to determine the total difference for the filtered object; and
selecting the filtered object that has a smallest total difference to be a recommended object.

19. The computer system of claim 18, wherein the plurality of filtered objects are consumer objects or inanimate objects.

20. The computer system of claim 18, wherein
the values of the attribute names of the filtered objects are values currently associated with the attribute names.

21. The computer system of claim 18, wherein
the values of the attribute names of a filtered object associated with a filtered selection reflect the values present when the filtered selection was made.

22. The computer system of claim 18, wherein
the location includes a physical location and a virtual location; and
the plurality of consumer objects includes psychographic information.

23. The computer system of claim 18, wherein the method further comprises transmitting the recommended object to a consumer device associated with the consumer object, wherein the values of the attribute names of the consumer object and the values of the attribute names of the filtered object selected as the recommended object are modified if the recommended object is selected.

24. The computer system of claim 18 wherein the plurality of past selections is limited to a look-back period.

25. The computer system of claim 18 wherein the plurality of filtered selections is identified with a context object, the context object having a plurality of attribute names, each attribute name of the context object having a value that is equal to an average value of the corresponding attribute names of the plurality of filtered objects.

* * * * *